United States Patent Office 3,244,704
Patented Apr. 5, 1966

3,244,704
METHOD FOR THE PRODUCTION OF THERAPEUTICALLY VALUABLE 4-OXO-($\beta$-AMINOETHYL)-3,4-DIHYDRO-(BENZO-1,3 OXAZINE) AND SALTS THEREOF
Vittorio Molina di Gaudenzio, Novara, Italy (Strada Privata del Ciocche, Zona Baraggino Grande, Novara-Vignale, Italy)
No Drawing. Filed July 12, 1963, Ser. No. 294,734
Claims priority, application Switzerland, Feb. 5, 1963, 1,392/63
1 Claim. (Cl. 260—244)

The present invention relates to a method for the production of therapeutically valuable 4-oxo-2-($\beta$-amino-alkyl)-3,4-dihydro-(benzo-1,3-oxazine), and salts thereof respectively of the formula:

$$R_2 \text{—} \underset{\text{O}}{\overset{\text{O}}{\text{benzoxazine}}} \text{—NH—CH—}(CH_2)_n\text{-}R_1\text{·HCl}$$

wherein $R_1$ is either the radical —$NH_2$ of a primary amine, or radical —NH(alkyl) of a secondary amine monoalkyled with a lower alkyl, or radical —N(alkyl)$_2$ of a tertiary amine dialkyles with two lower alkyls, wherein $n$ is 1,2 or more and $R_2$ is either a hydrogen atom or a halogen atom, or the univalent radical —$NH_2$ of a primary amine.

Moreover the invention relates to compounds produced according to this method.

It is the primary object of the invention to provide new valuable drugs, which in addition to analgetic, antipyretic and antiphlogistic properties have a strong activity against various sorts of viruses.

With this and other objects in view, which will become apparent later from this specification, I provide a method for the production of 4-oxo-2-($\beta$-aminoalkyl)-3,4-dihydrobenzo-1,3-oxazines, and of the salts thereof having the formula:

$$R_2 \text{—} \underset{\text{O}}{\overset{\text{O}}{\text{benzoxazine}}} \text{—NH—CH—}(CH_2)_n\text{-}R_1\text{·HCl}$$

wherein $R_1$ is either the radical —$NH_2$ of a primary amine, or radical —NH(alkyl) of a secondary amine monoalkyled with a monoalkyl, or radical —N(alkyl)$_2$ of a tertiary amine dialkyles with two lower alkyls, $n$ denoting 1,2 or more and $R_2$ denoting a hydrogen atom or a halogen or univalent radical —$NH_2$ of a primary amine, comprising the steps of mixing superior aldehydes and particularly acroleins when $n=2$ in ethanolic solution with molar quantities of gaseous ammonia or of a corresponding primary or secondary amine, adding molar quantities of salicyl amide, substituted if desired, and treating the whole reaction mixture with hydrogen chloride.

The condensation is effected in 10% ethanol.

For the salicylamide components either unsubstituted salicyl amide comes into question, when $R_2$ denotes a hydrogen atom, or substituted in the 5-position by halogen or an amino group, when the oxamines substituted in the 6-position are to be produced. For example the following substituted salicyl amides are in question:

m-Chloro- or m-bromo-salicyl amide (=5 chloro- or bromo 2-hydroxy-benzoic acid) or m-Amino-salicylamide (=5 amino-2 hydroxy-benzoic acid).

For the introduction of the radical $R_1$ the following are used:

(a) For the radical —$NH_2$ of a primary amine: gaseous ammonia in ethanol,
(b) For the radical —NH(alkyl) of a secondary amine; a primary amine in ethanol, for example: N-monomethylamine or N-monoethylamine,
(c) For the radical —N(alkyl)$_2$ of a tertiary amine; a secondary amine inethanol, for example: N-dimethyl- or N-diethylamine.

The following examples are intended to explain the invention in more detail:

Example 1

In a solution of 56 grams (1 mol) acroleine in 10% ethanol 17 grams (1 mol) of gaseous ammonia are introduced. To this solution 137.1 grams (1 mol) of salicyl amide are added and the solution is cooled to 40° C. by flowing water.

At this temperature hydrogen chloride is introduced during 30 minutes. Stirring is continued a further half-hour without cooling whereafter the excess alcohol is distilled off in vacuum.

The remainder is now 4-oxo-2-($\beta$-aminoethyl)-3,4-dihydro-benzo-1,3 oxazine in the form of its hydrochloride. The yield amounts to 80% in theory.

The melting point of the product after recrystallisation from a mixture of ethanol and acetone 1:3 amounts to 310°–312° C. with decomposition.

Example 2

In a solution of 56 grams (1 mol) acroleine in 10% ethanol instead of ammonia as in the Example 1, 73.1 grams of diethylamine is added, otherwise one proceeds exactly as according to Example 1.

There results a 4-oxo-2-($\beta$-N-diethylaminoethyl)-3,4-dihydro-benzo-1,3 oxazine in the form of its hydrochloride with a yield of 80%.

This product is likewise recrystallised from a mixture 1:3 of ethanol and acetone.

While I have herein described what may be considered typical and particularly useful embodiments of my said invention, I wish it to be understood that, I do not limit my invention to the particular details and dimensions described and illustrated, for obvious modifications will occur to a person skilled in the art.

What I claim as my invention and desire to secure by Letters Patent is:

A method for the production of 4-oxo-2-($\beta$-aminoalkyl)-3,4-dihydro-(benzo-1,3-oxazines) and the salts thereof having the formula $$R_2 \text{—} \underset{\text{O}}{\overset{\text{O}}{\text{benzoxazine}}} \text{—NH—CH—}(CH_2)_2\text{-}R_1\text{·HCl}$$

wherein $R_1$ is selected from the group consisting of primary, secondary and tertiary amino and $R_2$ is selected from the group consisting of hydrogen, halogen and a primary amine, comprising the steps of mixing acrolein in a 10% ethanol solution with molar quantities of a member from the group consisting of gaseous ammonia, a primary amine and a secondary amine, adding molar quantities of salicylamide, and treating the whole reaction mixture with hydrogen chloride, said salicylamide being unsubstituted or substituted in the 5-position by a halogen or a primary amine.

References Cited by the Examiner

UNITED STATES PATENTS

| | | | |
|---|---|---|---|
| 2,943,087 | 6/1960 | Ohnacker et al. | 260—244 |
| 3,116,292 | 12/1963 | Polo-Friz | 260—244 |

FOREIGN PATENTS

| | | |
|---|---|---|
| 570,639 | 2/1959 | Belgium. |

OTHER REFERENCES

Houben-Weyl: "Methaden der Organischen Chemie," Ban XI/1 Stickstoffverbindungen II, pp. 284–5 (Georg Thieme Verlag) (1957).

Ingold: "Structure and Mechanism in Organic Chemistry," pp. 694–5 (Cornell) (1953).

WALTER A. MODANCE, *Primary Examiner.*

NICHOLAS S. RIZZO, JOHN D. RANDOLPH,
*Examiners.*

ROBERT T. BOND, *Assistant Examiner.*